March 17, 1964 J. G. MILLER 3,125,619
FORMING PLASTIC CONTAINERS
Filed March 1, 1957 2 Sheets-Sheet 1
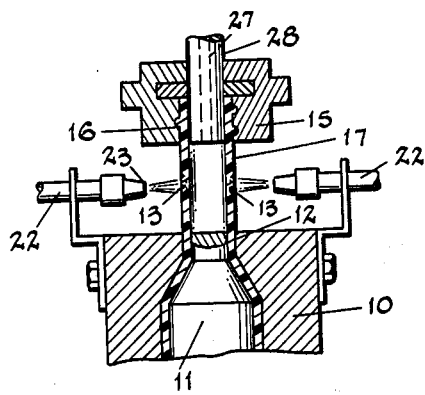
Fig. 1.
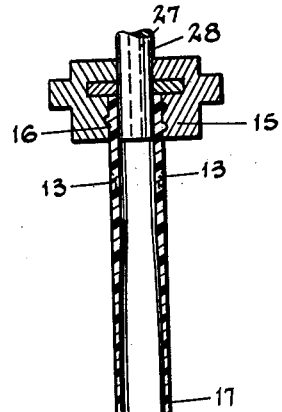
Fig. 3.
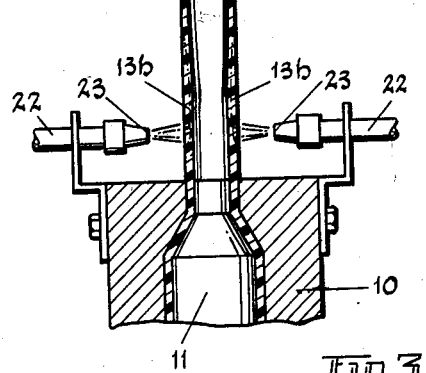
Fig. 2.
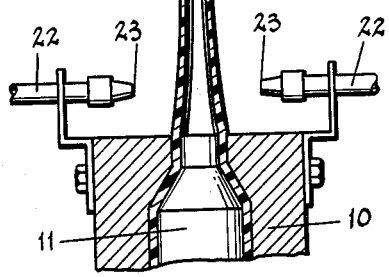
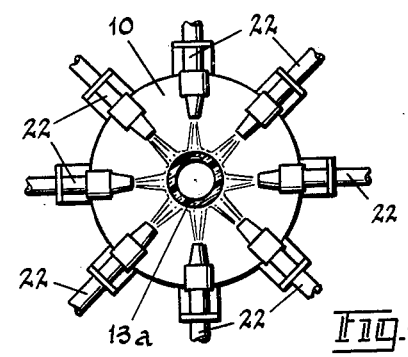
Fig. 5.
Fig. 4.
INVENTOR.
JOHN G. MILLER
BY
ATTORNEYS March 17, 1964   J. G. MILLER   3,125,619
FORMING PLASTIC CONTAINERS
Filed March 1, 1957   2 Sheets-Sheet 2
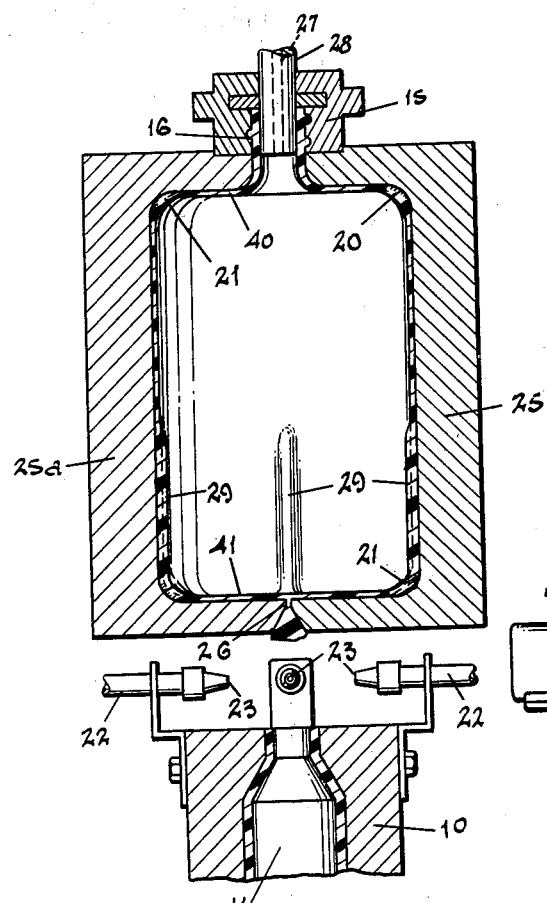
Fig. 6.
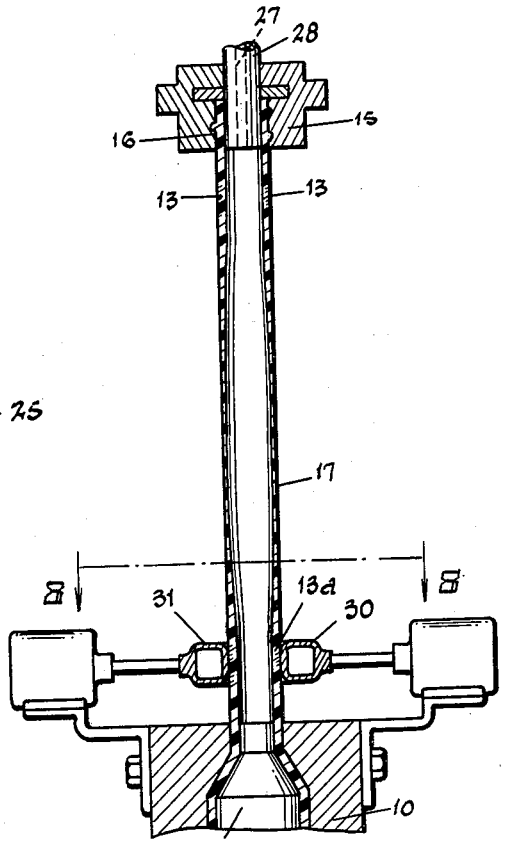
Fig. 7.
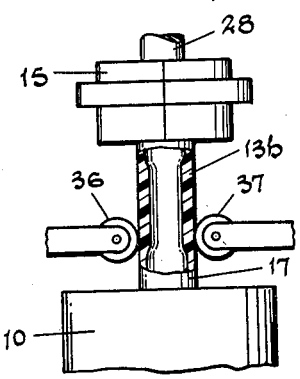
Fig. 9.
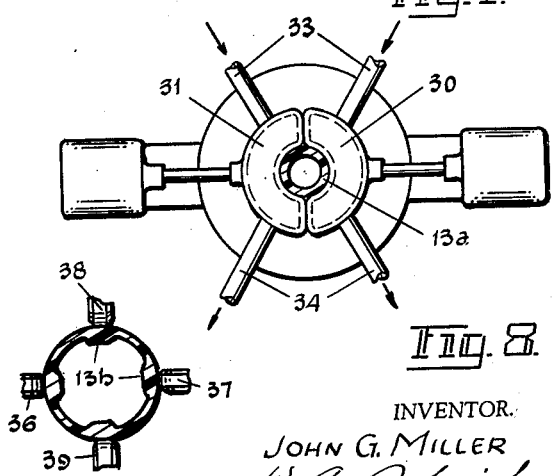
Fig. 8.
Fig. 10.
INVENTOR.
JOHN G. MILLER
BY W. A. Schaich
Leonard S. Oulie
ATTORNEYS

United States Patent Office 3,125,619
Patented Mar. 17, 1964

3,125,619
FORMING PLASTIC CONTAINERS
John G. Miller, Toledo, Ohio., assignor to Owens-Illinois Glass Company, a corporation of Ohio
Filed Mar. 1, 1957, Ser. No. 643,282
1 Claim. (Cl. 264—98)

My invention relates to forming plastic articles such as bottles, jars, or containers or various shapes, sizes, and for various uses.

This invention is particularly concerned with the control or distribution of the plastic material in the wall portions of containers and discloses a method and apparatus for so doing.

In the manufacture of plastic containers by presently known methods the distribution of material in the walls of the articles is solely dependent upon the accuracy of the articles is solely dependent upon the accuracy maintained in the walls of the preformed tubular member as extruded and the total overall temperature of the material as extruded.

The primary object of this invention is to progressively control the temperature of several areas through and along the length of the tubular member as extruded.

A further object is controlling the wall thickness in specific areas of the ultimately blown article by controlling both the temperature and the amount of stretch of the tube during the extrusion period.

Another object is to control or provide such control of wall distribution of the organic plastic material by subjecting surface areas of the tubular preform to temperature control mediums as it is extruded in such tubular form.

Other objects will be apparent from the disclosure set forth hereinafter.

In the accompanying drawings:

FIG. 1 illustrates the application of either a spot or circumferential cooling medium to the outer portions of the tubular formation as the extrusion begins;

FIG. 2 illustrates how the same tube formation may be affected by the amount of stretch during extrusion;

FIG. 3 illustrates how the tube formation may be controlled as to thickness by changes in the amount of stretch in combination with the cooling;

FIG. 4 illustrates the desirable arrangement of cooling nozzles in order to obtain the circumferential cooling of the extrusion;

FIG. 5 illustrates the arrangement of the cooling nozzles or other means for the application of a plurality of cooled spots or longitudinal stripes about or along the length of the tube formation;

FIG. 6 illustrates the distribution control which may be obtained in the finally blown round ware by the cooling means of FIGS. 4 and 8 or that which may be obtained in the corners of a square bottle by the cooling arrangement of FIGS. 5 and 10;

FIG. 7 illustrates how the circumferential cooling control may be effected by physical contact or by means other than gaseous means;

FIG. 8 is a view taken at 8—8 on FIG. 7 and illustrates the tube encompassing means of FIG. 7;

FIG. 9 illustrates a rolling contact cooling means adapted to contact the tube formation along its length as it is extruded; and FIG. 10 illustrates in exaggerated form, the effect of the contact between the rolls of FIG. 9 and the material, as well as the effect of the application of the gaseous means of FIG. 5 when applied along the length of the tube as extruded.

Referring to the drawings, and in particular to FIG. 1, there is illustrated the essential apparatus for carrying out the method which forms the essence of this invention.

For the particular details of the various mechanisms and the means for operating same, reference should be made to a co-pending application of Mumford et al., S.N. 403,594, filed Jan. 12, 1954, and owned by a common assignee, now abandoned.

In carrying out this method an extruder nozzle of the usual type is provided, which is adapted to extrude organic plastic material in tubular form by and through the insertion of a mandrel 11 in the nozzle 10 and the orifice 12.

To initiate the method a partible neck mold 15 (FIGS. 1 and 2) will be positioned in register with the orifice 12 and the neck cavity thereof will be filled with organic plastic material. Subsequently the neck mold 15 will be moved upwardly at a speed slightly faster than the plastic material is being forced from the orifice opening 12. This difference in the rate of speed of movement as between the neck mold 15 and the extrusion is a normal operation and is for the purpose of placing the tubular extrusion under longitudinal tension in order to thereby extrude a tubular blank 17 in which the walls will be of equal cross-sectional area.

In this new method it is contemplated to control or vary the cross-sectional area of the walls of the tubular member 17 as it is extruded and blown and to control these wall variations in either a defined area or along progressively continuing areas. Therefore as the neck mold proceeds on its upward movement, a tubular blank is formed as an integral part of the neck formation and said blank 17 will issue from the orifice 12 under tension, thus providing the above-mentioned equality of cross-sectional area. During this extrusion it is desirable to chill certain defined areas along certain surfaces of the blank 17 as it is being extruded in order to later provide a resistance to the stretching action of the blank 17 during the final blowing operation to thereby control the wall thickness of the ultimately blown aricle in certain defined or definite portions of its wall structure. For example, it might be desirable to make the shoulder corners of either a round or a square article of heavier cross section in order to increase the rigidity of the package or container. For example, such increased areas are shown at 20 and 21 in FIG. 6. To obtain these increased thicknesses some form of a gaseous cooling medium will be applied to the blank 17 as it issues from the orifice 12, through nozzles 22 which may be spaced about the vertical axis of the extruded member 17 (as shown in FIGS. 4 and 5). These nozzles 22 will be provided with orificial openings 23 of a specific contour in order that the area of impingement of the gaseous cooling medium on the external surface areas 13 of the blank 17 may be definitely defined both as to size and shape.

As shown in FIG. 1, the nozzles 22 are illustrated as impinging the cooling medium on the outside surfaces of the blank 17 during its extrusion and at a point 13 just below the neck mold 15. As the extrusion continues and the neck mold 15 moves upwardly, for example at a speed slightly greater than that of the extrusion, the walls of the blank 17 will tend to stretch and thin down, such as is shown in FIG. 2. As the neck mold nears its uppermost position its speed will be reduced, thus permitting the cross-sectional area of the tubular extrusion to resume its normal thickness. At this time (as shown in FIG. 3) the nozzles 22 will be again actuated to apply the chilling medium either to four spots 13 around the circumference thereof, as indicated by the arrangement of the nozzles in FIG. 5, or to provide a complete circumferential area 13a of chilled material as indicated by the arrangement of the nozzles in FIGS. 4 and 8. Such circumferential chilling 13a will provide the increased shoulders 20 as indicated in FIG. 6, particularly in a round bottle; or if the bottle happens to be of a square cross section, then the nozzle chilling 13 as indicated in FIG. 5, will provide the increased material in the four separate corners.

With the completion of the extrusion of a sufficient length of tubular blank 17, the vertical movement of the neck mold 15 is arrested and the halves 25 and 25a of a blow mold are closed around the extrusion, pinching the tubular extrusion at the point 26, thus sealing the tube or blank 17. Immediately thereafter, air is admitted through the channel 27 in the neck mold plunger 28 to expand the tube to the shape shown in FIG. 6. The chilled areas 13 imparted to the blank 17 will resist stretching during the final blowing operation and will result in the heavy portions 20 and 21 in the corners as shown.

In the making of square or irregular shaped containers it may be desirable at times to increase the thickness of the corners along and longitudinal to the length. In order to accomplish this the nozzles 22 may be arranged in any desirable pattern to match the corners of a square bottle, hexagonal, or some other regular or irregular pattern. For example, in making a square bottle the nozzles 22 may be arranged as shown in FIG. 5 and as the neck mold 15 starts its upward movement as indicated in FIG. 1, the gaseous cooling medium will be momentarily admitted from the nozzles 22 to provide the desired chill areas 13 for the corners 21 and 22. The extrusion of blank 17 will continue for example, until approximately half of its length has been extruded and then the cooling medium will again issue from the nozzles 22, and such a condition will continue and provide thereby the required chilling areas 13b in the material along a remaining length of blank 17 sufficient to provide thickened portions 29 along the corners or along the sides of the container (as shown in FIGS. 6 and 7). At such time as a sufficient length of chill 13b has been applied to blank 17, the cooling medium will be discontinued and the continued extrusion will provide an additional length of material in unchilled condition which will be utilized to form the bottom portions of the container. However, if it is desired to have the thickened rib-like structure extend or continue along the bottom of the container, then the cooling application may be continued until such time as the mold is about to be closed about the tubular blank 17. When any such an extrusion has been enclosed in the mold and the tubular member 17 has been expanded to the confines of the mold, it will be found that these chilled longitudinal areas 13b will be displaced, for example, into the corners of a square mold, thus permitting a rigid framework with comparatively thin wall sections between each such thickened portion. This same procedure may also be utilized to provide a ribbed formation on a cylindrical or any differently shaped container.

It is possible to obtain these various chilled areas by a physical contact means rather than the gaseous chilling means and such has been illustrated in FIG. 7. In this FIG. 7 the neck mold 17 is approaching the upper end of its vertical motion and cooling members 30 and 31 are shown as in physical contact with the extruding tubular form 17. Such contact may be a sliding contact as between the organic material of the tube and the ironing or chilling surfaces of the members 30 and 31, or the members 30 and 31 may move a short distance with the tube as it is being extruded to thereby cause the imparted chill 13a to have the same area as that of the contact portions of the chilling members 30 and 31. These chilling members 30 and 31 may be cooled either by air or water, or any other cooling medium, by passing same through the inlet pipe 33 and out through the outlet 34.

A further means of such contact chilling may be accomplished by providing chilling members which have a rolling contact with the extrusion or blank 17. For example, in FIG. 9, the neck mold is shown starting its upward movement and the chilling rolls 36 and 37 are shown in direct physical rolling contact with the outer surface areas of the extrusion blank 17. In this manner chilled areas 13b may be provided along the length of the blank 17 as it is being extruded. Any desired number of these chilling rolls may be provided around the circumference of the blank 17, as for example, as shown in FIG. 10, where the additional rollers 38 and 39 are shown illustrating how the corner portions along the length of a square bottle may be thickened by chilling contact with these spaced-apart members.

It is also possible with this method to provide a tubular extrusion for a container in which that portion of the extrusion which will ultimately form the top walls 40 (FIG. 6) and the bottom walls 41 may be extruded without any chilling contact being applied thereto, but the remaining portion of the tubular blank 17 between these two extremities on the said tubular blank will be maintained in contact throughout the extrusion period with either the gaseous medium from the nozzles 22 or in sliding contact with the ironing members 30 and 31 of FIG. 7. In this manner the side walls of the container will be chilled sufficiently to resist excessive stretching and consequently will be of much thicker cross-sectional area than the top and bottom walls 40 and 41.

Other variations of this control of wall thickness may also be adopted, for example, during a portion only of the extrusion, longitudinal or lengthwise chilling of the blank 17 may occur and during the remainder of the extrusion all chilling can be avoided. Thus, heavy and light walls and rib-like formations may be provided along a portion only of the length of the container. Such similar variation in the circumferential areas of applying the chilled formations may also be accomplished within the purview of this method.

"Tubular" as applied to the extrusion of the hollow blank is to be construed as encompassing an extrusion which is circular in form or of any regular or irregular form.

Modifications may be resorted to within the spirit and scope of the appended claim.

I claim:

In a method of making a blown organic plastic article from a hollow tube extruded to a substantially constant wall thickness through an orifice, the steps of applying a chilling medium to axially spaced portions only of the exterior surface of said hollow tube as the tube is extruded, said chilling medium being applied to substantially less than the entire tube length and extracting sufficient heat from the portions to which said medium was applied to substantially reduce the expansibility of said portions, subsequently axially elongating the tube to form a tubular blank of differential wall thickness, the wall thickness of said blank being greater at those portions to which said medium was applied, enclosing said tubular blank in a blow mold, and then injecting air under pressure into said blank to expand the blank to its final article configuration in the mold, the expansion of the blank being non-uniform due to the variant wall thickness thereof.

References Cited in the file of this patent

UNITED STATES PATENTS

| | | |
|---|---|---|
| 2,262,612 | Kopitke | Nov. 11, 1941 |
| 2,336,822 | Wadman | Dec. 14, 1943 |
| 2,377,946 | Leary | June 12, 1945 |
| 2,512,844 | Weber | June 27, 1950 |
| 2,529,897 | Bailey et al. | Nov. 14, 1950 |
| 2,531,540 | Smith | Nov. 28, 1950 |
| 2,632,202 | Haines | Mar. 24, 1953 |
| 2,710,987 | Sherman | June 21, 1955 |
| 2,749,572 | Nowak | June 12, 1956 |
| 2,750,625 | Colombo | June 19, 1956 |

OTHER REFERENCES

| | | |
|---|---|---|
| 200,129 | Australia | Nov. 2, 1955 |
| 740,458 | Great Britain | Nov. 16, 1955 |